(12) United States Patent
Ward et al.

(10) Patent No.: US 9,530,083 B2
(45) Date of Patent: Dec. 27, 2016

(54) INPUT TRAY SELECTION MECHANISM

(71) Applicants: David Ward, Broomfield, CO (US); Aritra Bandyopadhyay, Boulder, CO (US)

(72) Inventors: David Ward, Broomfield, CO (US); Aritra Bandyopadhyay, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/709,673

(22) Filed: May 12, 2015

(65) Prior Publication Data
US 2015/0242727 A1 Aug. 27, 2015

(51) Int. Cl.
G06K 9/36 (2006.01)
G06K 15/02 (2006.01)
G06K 15/00 (2006.01)
G06F 3/12 (2006.01)

(52) U.S. Cl.
CPC ......... *G06K 15/1823* (2013.01); *G06F 3/1204* (2013.01); *G06F 3/1205* (2013.01); *G06F 3/1206* (2013.01); *G06F 3/1254* (2013.01); *G06F 3/1257* (2013.01); *G06F 3/1285* (2013.01); *G06K 15/1878* (2013.01); *G06K 15/407* (2013.01); *G06K 15/4065* (2013.01)

(58) Field of Classification Search
CPC .... G06F 3/1204; G06F 3/1205; G06F 3/1206; G06F 3/1254; G06F 3/1257; G06F 3/1285; G06K 15/1823; G06K 15/1878; G06K 15/4065; G06K 15/407

USPC .......................... 382/166; 358/1.13, 1.6, 498
See application file for complete search history.

(56) References Cited

U.S. PATENT DOCUMENTS

| | | | |
|---|---|---|---|
| 5,129,639 A | 7/1992 | DeHority | |
| 6,625,508 B1 | 9/2003 | Purvis | |
| 8,233,178 B2 | 7/2012 | Robinson et al. | |
| 8,520,232 B2 | 8/2013 | Harmon et al. | |
| 8,605,321 B2* | 12/2013 | Nakai | H04N 1/00846 358/1.13 |
| 8,823,987 B2 | 9/2014 | Sponable et al. | |
| 8,854,646 B2* | 10/2014 | Arita | G06K 15/1809 358/1.13 |
| 2005/0105146 A1* | 5/2005 | Tanaka | G03G 15/6508 358/498 |
| 2005/0254078 A1* | 11/2005 | Patton | G06F 3/1205 358/1.13 |
| 2006/0119874 A1* | 6/2006 | Kurihara | H04N 1/2323 358/1.13 |
| 2006/0119879 A1* | 6/2006 | Nakai | H04N 1/00846 358/1.14 |
| 2007/0202473 A1* | 8/2007 | Koda | G09B 19/0053 434/118 |

(Continued)

OTHER PUBLICATIONS

Partial European Search Report, EP16168764, 7 pages, Oct. 14, 2016.

*Primary Examiner* — Mek Onen Bekele
(74) *Attorney, Agent, or Firm* — Blakely, Sokoloff, Taylor & Zafman LLP (57) ABSTRACT

A method is disclosed. The method includes receiving a print job data stream, selecting an appropriate input tray from which to print the print job based on a set of rules indicated in one or more tables and performing an action indicated in the one or more tables.

19 Claims, 6 Drawing Sheets

(56) References Cited

U.S. PATENT DOCUMENTS

| | | | |
|---|---|---|---|
| 2009/0129638 A1* | 5/2009 | Kim | G06K 9/00295 382/118 |
| 2009/0160117 A1* | 6/2009 | Negishi | B65H 3/44 271/3.14 |
| 2011/0032569 A1 | 2/2011 | Ohashi | |
| 2011/0233852 A1* | 9/2011 | Ikarashi | B65H 39/10 271/207 |
| 2013/0077110 A1 | 3/2013 | Ogino | |
| 2013/0083363 A1 | 4/2013 | Kim et al. | |
| 2013/0094060 A1 | 4/2013 | Jaudon et al. | |

* cited by examiner

| Job Fidelity | Valid_Input_Tray | Duplex match | Big 5 and orientation match | Action | Comment |
|---|---|---|---|---|---|
| 0 | 0 | 0 | 0 | Abort | Because Valid_Input_Tray failed |
| 0 | 0 | 0 | 1 | Abort | Because Valid_Input_Tray failed |
| 0 | 0 | 1 | 0 | Abort | Because Valid_Input_Tray failed |
| 0 | 0 | 1 | 1 | Abort | Because Valid_Input_Tray failed |
| 0 | 1 | 0 | 0 | Abort | They tray can support Big 5, however duplex is not allowed. So, instead of prompting for Big 5 and then abort job, we will abort without prompting. |
| 0 | 1 | 0 | 1 | Abort | They tray can support Big 5, however duplex is not allowed. So, instead of prompting for Big 5 and then abort job, we will abort without prompting. |
| 0 | 1 | 1 | 0 | Prompt | |
| 0 | 1 | 1 | 1 | Tray-OK | |
| 1 | 0 | 0 | 0 | Change_Tray | Because Valid_Input_Tray failed |
| 1 | 0 | 0 | 1 | Change_Tray | Because Valid_Input_Tray failed |
| 1 | 0 | 1 | 0 | Change_Tray | Because Valid_Input_Tray failed |
| 1 | 0 | 1 | 1 | Change_Tray | Because Valid_Input_Tray failed |
| 1 | 1 | 0 | 0 | Make_Simplex_Prompt | Prompt for requested tray and media, but will make simplex in SQM |
| 1 | 1 | 0 | 1 | Make_Simplex_OK | Tray_OK but job will print simplex |
| 1 | 1 | 1 | 0 | Prompt | |
| 1 | 1 | 1 | 1 | Tray_OK | |

Figure 2

| Some_tray_Tray_OK? | Some_tray_Make_Simplex_Tray_OK? | Some_Tray_Prompt? | Some_Tray_Make_Simplex_Prompt_or_Change_Tray? | Some_Tray_(say abort)? | Action |
|---|---|---|---|---|---|
| 0 | 0 | 0 | 0 | 0 | N/A |
| 0 | 0 | 0 | 0 | 1 | Abort |
| 0 | 0 | 0 | 1 | 0 | Make_Simplex_Prompt for any tray |
| 0 | 0 | 0 | 1 | 1 | Make_Simplex_Prompt with any tray |
| 0 | 0 | 1 | 0 | 0 | Prompt for any tray |
| 0 | 0 | 1 | 0 | 1 | Prompt for any tray |
| 0 | 0 | 1 | 1 | 0 | Prompt for any tray |
| 0 | 0 | 1 | 1 | 1 | Prompt for any tray |
| 0 | 1 | 0 | 0 | 0 | Make_Simplex_Tray_OK with the first tray found Make_Simplex_Tray_OK |
| 0 | 1 | 0 | 0 | 1 | Make_Simplex_Tray_OK with the first tray found Make_Simplex_Tray_OK |
| 0 | 1 | 0 | 1 | 0 | Make_Simplex_Tray_OK with the first tray found Make_Simplex_Tray_OK |
| 0 | 1 | 0 | 1 | 1 | Make_Simplex_Tray_OK with the first tray found Make_Simplex_Tray_OK |
| 0 | 1 | 1 | 0 | 0 | Make_Simplex_Tray_OK with the first tray found Make_Simplex_Tray_OK |
| 0 | 1 | 1 | 0 | 1 | Make_Simplex_Tray_OK with the first tray found Make_Simplex_Tray_OK |
| 0 | 1 | 1 | 1 | 0 | Make_Simplex_Tray_OK with the first tray found Make_Simplex_Tray_OK |
| 0 | 1 | 1 | 1 | 1 | Make_Simplex_Tray_OK with the first tray found Make_Simplex_Tray_OK |
| 1 | 0 | 0 | 0 | 0 | Tray_OK with the first tray found Tray_OK |
| 1 | 0 | 0 | 0 | 1 | Tray_OK with the first tray found Tray_OK |
| 1 | 0 | 0 | 1 | 0 | Tray_OK with the first tray found Tray_OK |
| 1 | 0 | 0 | 1 | 1 | Tray_OK with the first tray found Tray_OK |
| 1 | 0 | 1 | 0 | 0 | Tray_OK with the first tray found Tray_OK |
| 1 | 0 | 1 | 0 | 1 | Tray_OK with the first tray found Tray_OK |
| 1 | 0 | 1 | 1 | 0 | Tray_OK with the first tray found Tray_OK |
| 1 | 0 | 1 | 1 | 1 | Tray_OK with the first tray found Tray_OK |
| 1 | 1 | 0 | 0 | 0 | Tray_OK with the first tray found Tray_OK |
| 1 | 1 | 0 | 0 | 1 | Tray_OK with the first tray found Tray_OK |
| 1 | 1 | 0 | 1 | 0 | Tray_OK with the first tray found Tray_OK |
| 1 | 1 | 0 | 1 | 1 | Tray_OK with the first tray found Tray_OK |
| 1 | 1 | 1 | 0 | 0 | Tray_OK with the first tray found Tray_OK |
| 1 | 1 | 1 | 0 | 1 | Tray_OK with the first tray found Tray_OK |
| 1 | 1 | 1 | 1 | 0 | Tray_OK with the first tray found Tray_OK |
| 1 | 1 | 1 | 1 | 1 | Tray_OK with the first tray found Tray_OK |

```
Algorithm: SelectTray
Input: trayNo, Table-1, job-requirements, action priorities
Output: selectedTrayNo, final action if (trayNo != -1 /*tray is specified*/) {
    Match job requirement with the content of the tray
    action = Look up table 1 to determine the action
    if (action == Change_Tray) {
        {selectedTray, finalAction} = searchTray(action-priorities);
         return {selectedTray, finalAction};
    } else {
        selectedTray = trayNo;
        finalAction = action;
        return {selectedTray, finalAction};
    }
}
else /*tray is not specified*/ {
    {selectedTray, finalAction} = searchTray(action-priorities);
     return {selectedTray, finalAction};
}
```

Figure 5

```
Algorithm: searchTray
Input: action-priorities, job-requirement
output: selectedTray, finalAction for each tray {
    Match job requirement with the content of the tray
    Look up table 1 to determine the action
} generate Table 2 based on action-priorities
{selectedTray, finalAction} = look up table 2 for final action and selected tray using the action for each tray return {selectedTray, finalAction};
```

INPUT TRAY SELECTION MECHANISM

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to the field of printing systems, and in particular, to processing print jobs at a printing system.

BACKGROUND

In the field of printing, users prefer systems that allow for flexible processing of print jobs, which typically comprise print data received in the form of a page description language (PDL). A PDL data stream typically includes attributes that assist in defining processing steps that may be performed for the print job. Upon receiving a PDL data stream, a printer controller selects an appropriate input tray from which to print a job included within the PDL data stream. Subsequently, the controller takes an appropriate action depending on a degree to which the content of the tray matches the job requirement. Exemplary actions include prompting a user to load a required media, or aborting the job.

In some instances a job may specify a particular tray. Only an appropriate action needs to be determined in such instances. However, when a job does not specify a tray an appropriate tray needs to be selected. Additionally, the selection of trays and actions may vary depending on print fidelity (e.g., how to process a job when the requirements do not match completely).

Typically, two types of fidelity are considered: fail-job and print-anyway. In fail-job fidelity, job requirements must be completely satisfied in order to print the job, while in print-anyway fidelity some requirements may be compromised to print the job. The various contexts and variables render the logic of tray selection and determination of action complex and difficult to maintain. Moreover, customers often request changes in the behavior of tray selection and prompting for media, which require significant effort to implement.

Accordingly, a mechanism to model tray selection and determine appropriate actions is desired.

SUMMARY

In one embodiment, a method is disclosed. The method includes receiving a print job data stream, selecting an appropriate input tray from which to print the print job based on a set of rules indicated in one or more tables and performing an action indicated in the one or more tables.

BRIEF DESCRIPTION OF THE DRAWINGS

A better understanding of the present invention can be obtained from the following detailed description in conjunction with the following drawings, in which.

DETAILED DESCRIPTION

An input tray selection mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
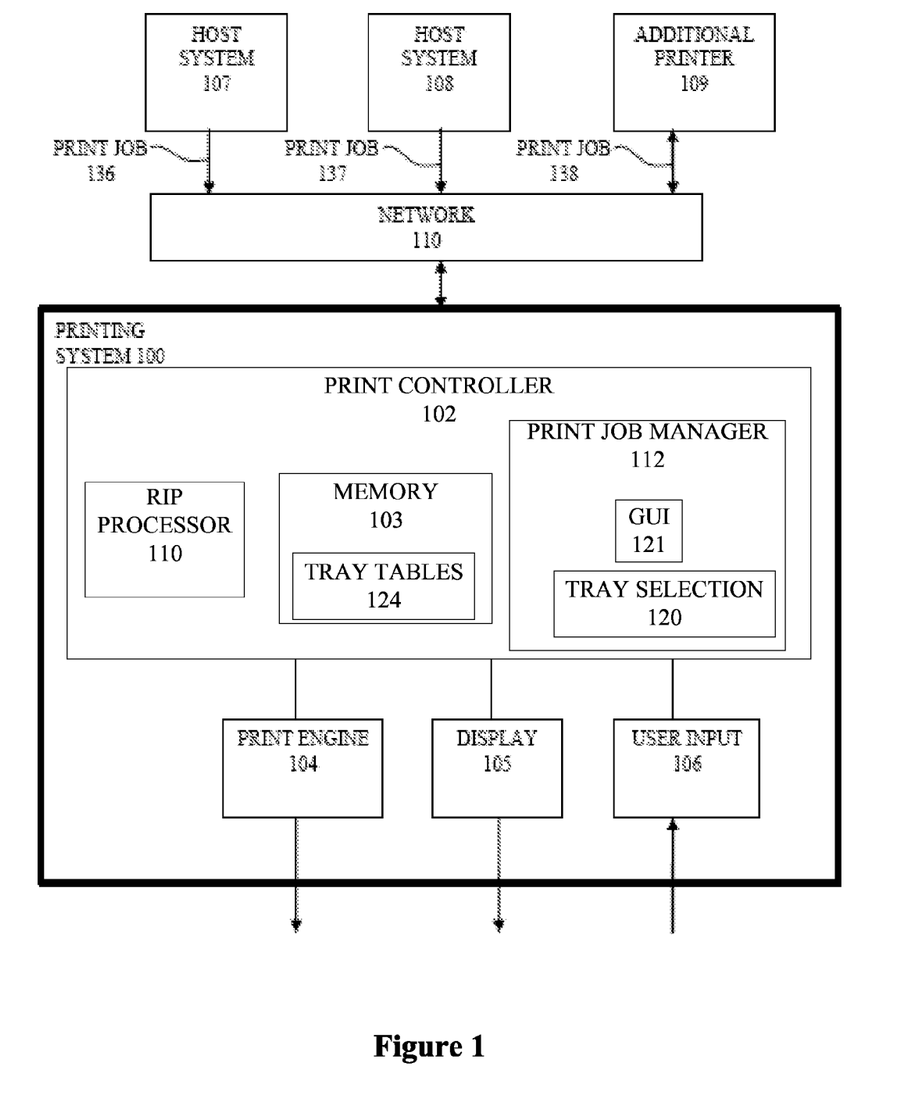
FIG. 1 illustrates one embodiment of a printing system.

FIG. 1 is a block diagram illustrating one embodiment of a printing system 100. Printing system 100 is a system used to provide marks on a media, such as a continuous forms printer or a cut sheet page printer. Printing system 100 may include any digital hardcopy output device, such as printers, copiers, multifunction printers (MFPs) and facsimiles.

In one embodiment, printing system 100 is shared by multiple users. In such an embodiment, printing system 100 includes a print controller 102 and one or more print engines 104. Print controller 102 includes any system, server, or components operable to interface one or more host systems 107 and 108, and a printer 109, via network 110 with one or more print engines 104, and to control the printing of print jobs 136-138 received from the host systems 107 and 108, and a printer 109, respectively, on print engine 104. Print engine 104 provides an imaging process to mark a printable medium, such as paper.

According to one embodiment, print controller 102 includes memory 103, RIP processor 110 and a print job manager 112. Memory 103 includes any storage system operable to store data. RIP processor 110 performs rasterization to convert print data received in the form of a page description language (PDL) to image bitmap data. In one embodiment, print job manager 112 manages the printing of documents at printing system 100. Particularly, print job manager 112 controls print jobs as they wait to print, arranges the priority of the print jobs, generates separator pages and distributes jobs to the destination print engine 104. In one embodiment, print job manager 112 may be implemented using either InfoPrint Manager (IPM) or InfoPrint ProcessDirector (IPPD), although other types of print job managers may be used instead.

In one embodiment, print job manager 112 holds received print jobs in memory 103 before processing the print job. In such an embodiment, memory 103 stores the print jobs as either a data file or rasterized bitmap file. For example, print jobs stored as rasterized files reduce print time for the held jobs versus those stored as data files. Once stored, each print job may be held until the user that generated the print job retrieves the corresponding document from printing system 100, at which time the print job is processed and printed.

In a further embodiment, a user may release a selected job for printing at printing system 100 via user input 106. Printing system 100 thereby processes the print job by printing via print engine 104. In still a further embodiment, multiple selected print jobs being held for a particular user may be simultaneously processed and printed at print engine 104. Therefore, all print jobs for the same user are printed together when multiple print jobs are released to print.

According to one embodiment, print job manager 112 includes tray selection unit 120 that selects an appropriate input tray from which to print a received job. In such an embodiment, tray selection unit 120 performs tray selection based on a set of rules and determines appropriate actions that enable alteration (e.g., addition and/or modification) of the rules. In addition, tray selection unit 120 enables a user to configure actions via graphical user interface (GUI) 121 to suit a particular printing environment.

Figure 2:
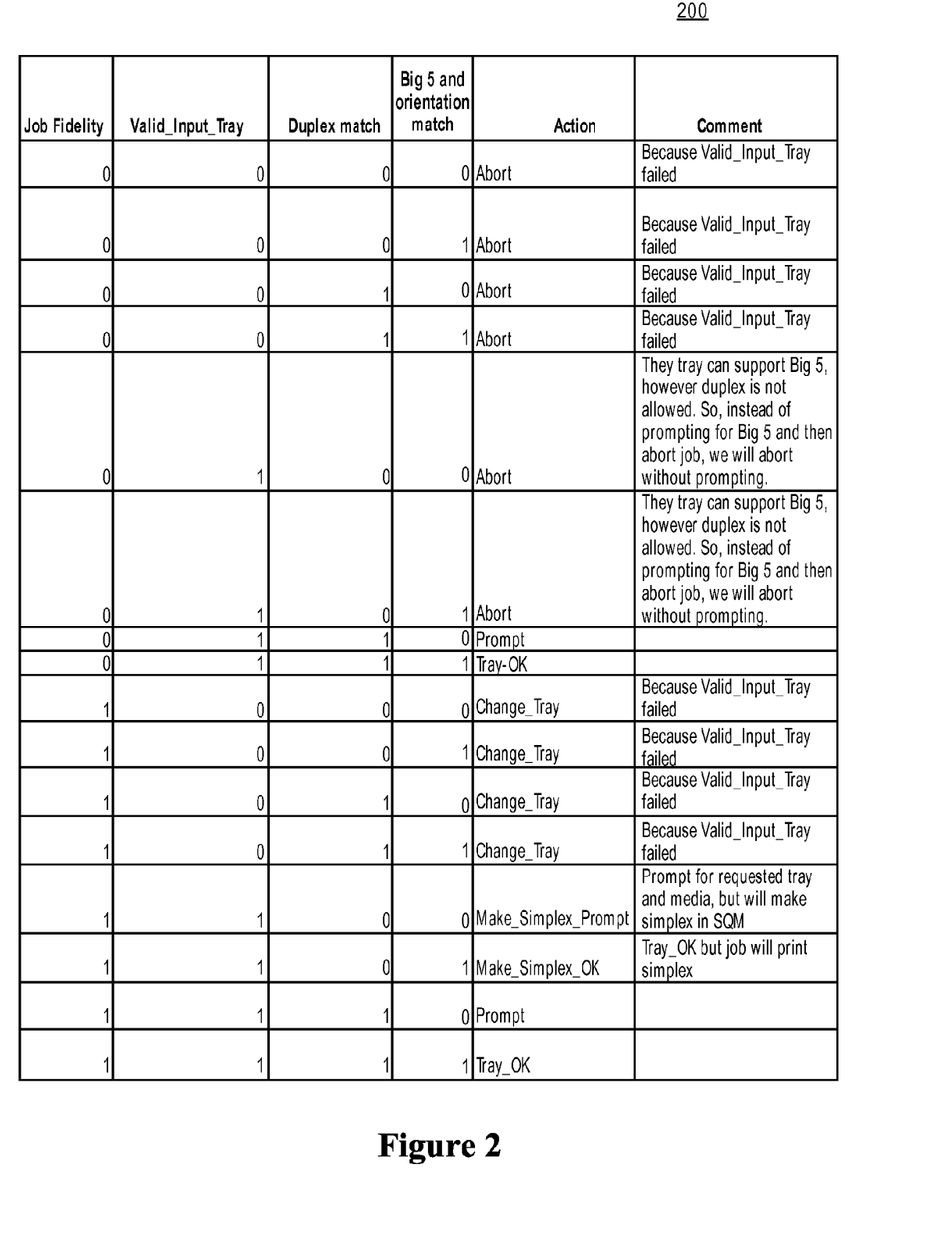
FIG. 2 illustrates one embodiment of an action-based table.

In one embodiment, tray selection unit 120 performs a tray selection process using a set of tray action tables 124 stored in memory 103. FIG. 2 illustrates one embodiment of an action table 200 that specifies an action to be taken based on a degree to which a tray matches a job requirement upon a job requesting a particular tray. In one embodiment, the degree to which a tray matches the job requirement is described by parameters. The parameters may include Job Fidelity, Tray Validity, Duplex Match, and Big 5 and Orientation Match.

The Job Fidelity parameter specifies how a job should be processed when the requirements do not match completely. In one embodiment, a logical 0 value=fail-job and logical 1 value=print-anyway. The Tray Validity parameter specifies if a tray is valid. A logical 0 value=invalid and a logical 1 value=valid. Duplex Match specifies whether a tray is capable of duplex printing on a required media if a job requests duplex printing. A logical 1 value=tray is capable, and logical value 0=tray is not capable. Big 5 and Orientation Match relate to basic job parameters. For instance, the Big 5 refers to basic job requirements such as width, height, weight, type, and color, while orientation is either long-edge-feed or short-edge-feed. A logical value 0=the media in the tray and the job requirement do not match in terms of at least one of the 5 properties and orientation. A logical 1 value a complete match.

According to one embodiment, various actions may be taken based on different combinations of the values of the above-described input parameters. Table 1 illustrates an embodiment of the actions that may be taken.

TABLE 1

| ACTION | DESCRIPTION |
| --- | --- |
| Abort | The job is aborted. |
| Prompt | The user is prompted to load the required media in the specified tray. |
| Tray_OK | The specified tray can be used to print the job; continue processing the job. |
| Change_Tray | The specified tray cannot be used to print the job and the printer may search for a different suitable tray to from which to print the job. |
| Make_Simplex_OK | Force the job to be simplex and use the specified tray to continue processing the job. |
| Make_Simplex_Prompt | Force the job to be simplex and then prompt the user to load the required media in the specified tray to continue processing the job from the tray. |

Figure 3:
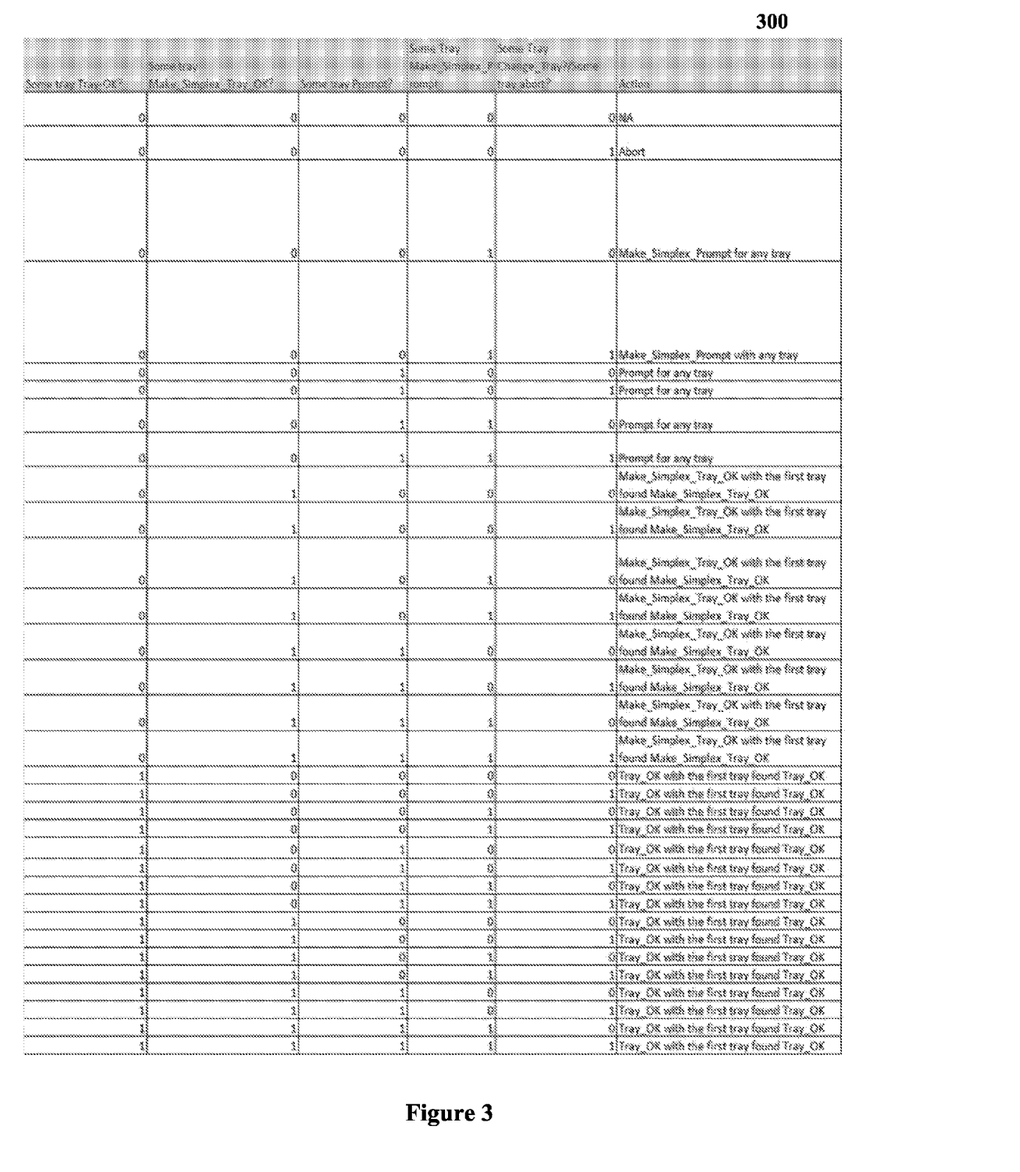
FIG. 3 illustrates another embodiment of an action-based table.

FIG. 3 illustrates one embodiment of an action table 300. In one embodiment, table 300 describes a tray selection and a course of action when a tray is not specified by a print job. In such an embodiment, table 200 is used to determine an appropriate action for each tray. Subsequently, a final action is determined using table 300 based on whether or not there were some trays corresponding to each action. In table 300, any column titled 'Some tray x?' has a logical 1 value if there was at least one tray found which would lead to action x.

According to one embodiment, table 300 assumes that the Tray_OK action has the highest priority because whenever some tray is Tray_OK, the final action is also Tray_OK, regardless of what action other trays result in. Similarly, Make_Simplex_Tray_OK has the next highest priority, followed by Prompt, Make_Simplex_Prompt and Abort. The priority of these actions, however, can be changed any time.

Figure 4:
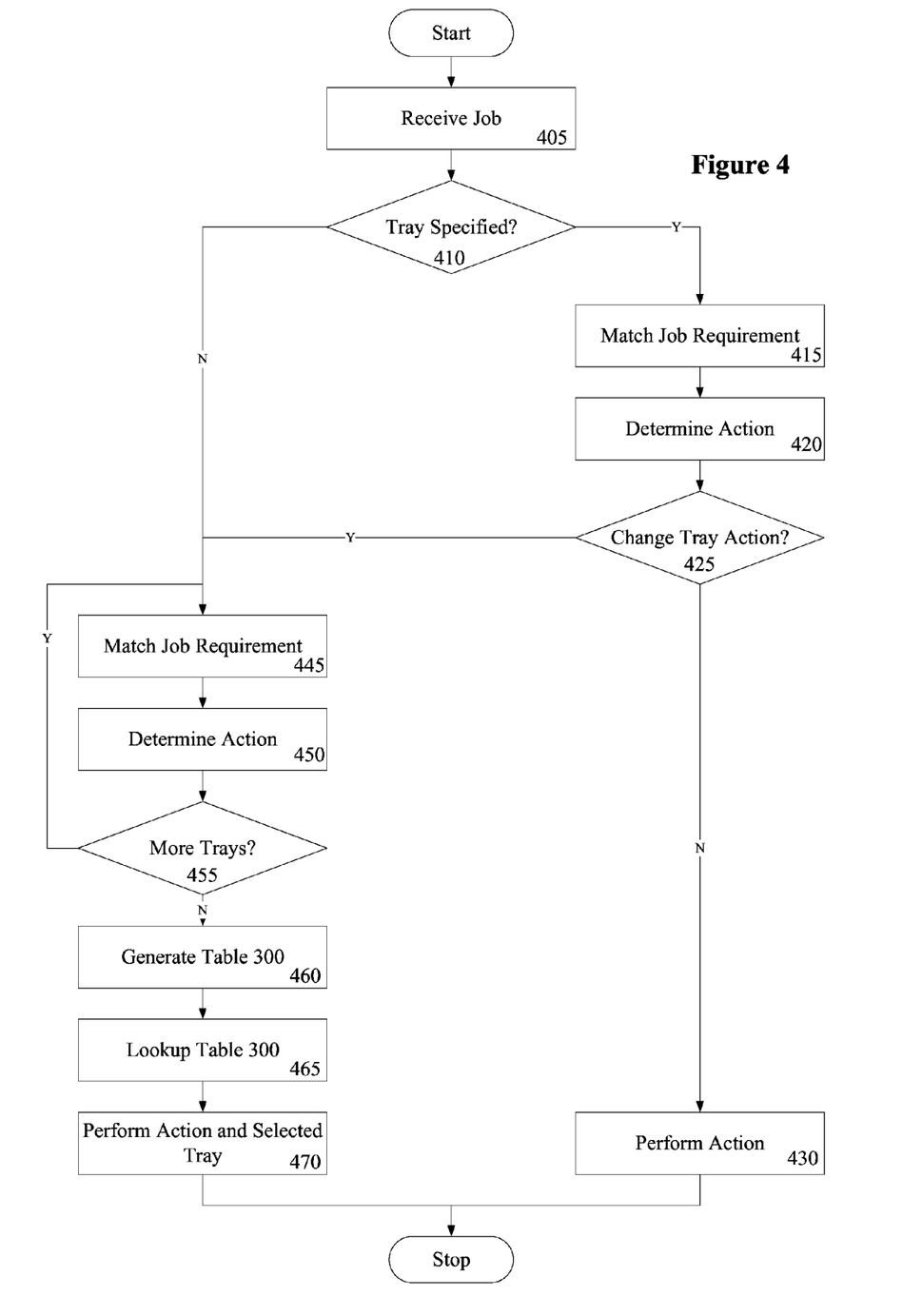
FIG. 4 is a flow diagram illustrating one embodiment of a tray selection process.

FIG. 4 is a flow diagram illustrating one embodiment of a method 400 for selecting a tray and determining an appropriate action based on action tables 200 and 300 and input priorities of actions. Method 400 may be performed by processing logic that may comprise hardware (e.g., circuitry, dedicated logic, programmable logic, etc.), software (such as instructions run on a processing device), or a combination thereof. In one embodiment, method 400 may be performed by tray selection unit 120. The processes of method 400 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-3 are not discussed or repeated here.

At processing block 405, a print job data stream is received at print controller 102. At decision block 410, a determination is made as to whether a tray from which the job is to be processed is specified in the print job data stream. If a determination is made that a tray is specified, job requirements specified in the print job data stream are matched with the content of the specified tray, processing block 415. At processing block 420, a lookup of table 200 is performed to determine an action that is to be implemented at the specified tray. At decision block 425, a determination is made as to whether the action is a change tray action. If not, the specified action in table 200 corresponding to the tray is performed, processing block 430.

However if the action is a change tray action, or a tray has not been specified at decision block 410, the job requirements specified in the print job data stream are matched with the content of a tray, processing block 445. At processing block 450, a lookup of table 200 is performed to determine an action that is to be implemented for the tray. At decision block 455, a determination is made as to whether there are additional trays to process. If so, control is returned to processing block 445 where the job requirements specified in the print job data stream are matched with the content of a second specified tray, and processing block 450 where a subsequent lookup of table 200 is performed. Accordingly, processing blocks 445 and 450 are implemented for each tray.

Figure 5:
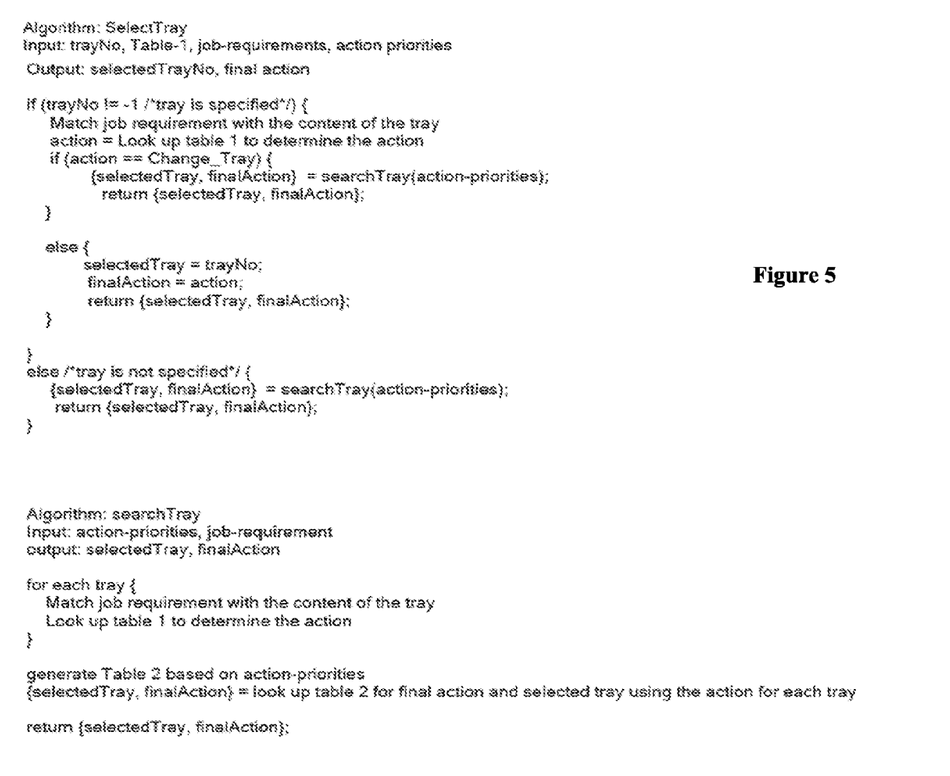
FIG. 5 illustrates one embodiment of code implemented to select a tray and determine an action.

Table 300 is generated upon determining there are no additional trays to process, processing block 460. At processing block 465, a lookup of table 300 is performed for a final action and a selected tray using the action for each tray. At processing block 470, the final action is performed from the selected tray. FIG. 5 illustrates one embodiment of program code corresponding to method 400.

Figure 6:
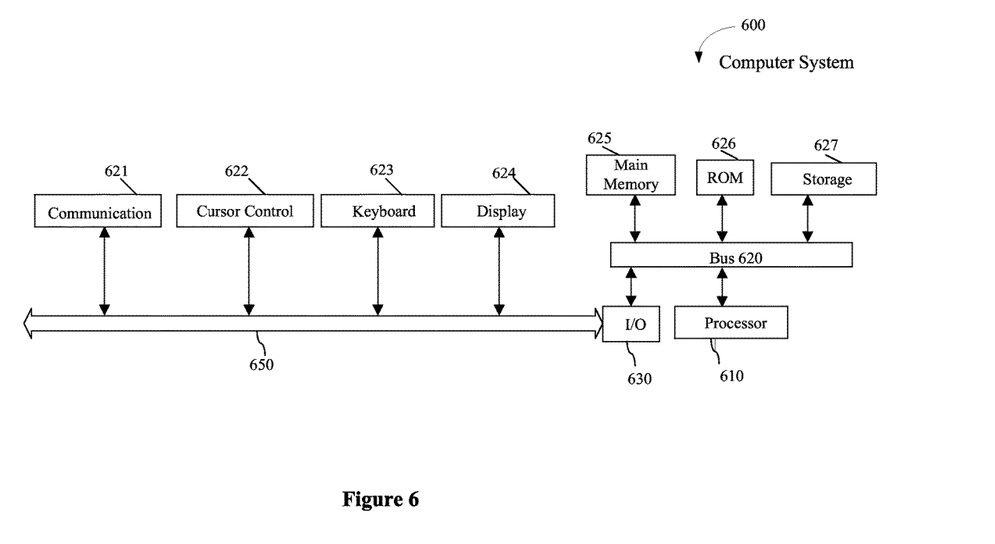
FIG. 6 illustrates one embodiment of a computer system.

FIG. 6 illustrates a computer system 600 on which printing system 100 may be implemented. Computer system 600 includes a system bus 620 for communicating information, and a processor 610 coupled to bus 620 for processing information.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients). The communication device 621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, cause the machine to perform operations comprising:
receiving a print job data stream;
processing the print job data stream to determine whether a tray has been specified;
matching job requirements specified in the print job data stream with content of the specified tray upon determining that a tray has been specified;
performing a lookup of a first of the one or more tables to determine an action that is to be implemented at the specified tray based on a degree to which the content of the specified tray matches a print job requirement, wherein the degree to which the content of the specified tray matches the print job requirement is described by parameters, and wherein the action is included in one or more actions configured via a graphical user interface; and
performing an action indicated in the one or more tables.

2. The machine readable of claim 1 including data that, when accessed by the machine, further cause the machine to perform operations comprising determining actions to enable alteration of a set of rules.

3. The machine readable of claim 1 wherein the parameters include at least an orientation match and a duplex match.

4. The machine readable of claim 1 including data that, when accessed by the machine, further cause the machine to perform operations comprising:
determining whether the action is a change tray action; and
performing the action upon determining that the action is a not change tray action.

5. The machine readable of claim 4 including data that, when accessed by the machine, further cause the machine to perform operations comprising:
matching job requirements specified in the print job data stream with content of a first tray upon determining that the action is a change tray action; and
performing a lookup of the first table to determine an action that is to be implemented at the first tray.

6. The machine readable of claim 5 including data that, when accessed by the machine, further cause the machine to perform operations comprising:
determining whether there are additional trays; and
for each additional tray:
matching job requirements specified in the print job data stream with content of the additional tray; and
performing a lookup of the first table to determine an action that is to be implemented at the additional tray.

7. The machine readable of claim 6 including data that, when accessed by the machine, further cause the machine to perform operations comprising:
generating a second of the one or more tables upon determining there are no additional trays;
performing a lookup of the second table to determine an action that is to be performed and select a tray corresponding to the action that is to be implemented; and
performing the action at the selected tray.

8. The machine readable of claim 1 including data that, when accessed by the machine, further cause the machine to perform operations comprising:
matching job requirements specified in the print job data stream with content of a first tray upon determining that a tray has not been specified; and
performing a lookup of the first table to determine an action that is to be implemented at the first tray.

9. The machine readable of claim 8 including data that, when accessed by the machine, further cause the machine to perform operations comprising:

determining whether there are additional trays; and
for each additional tray:
  matching job requirements specified in the print job data stream with content of the additional tray; and
  performing a lookup of the first table to determine an action that is to be implemented at the additional tray.

10. The machine readable of claim 9 including data that, when accessed by the machine, further cause the machine to perform operations comprising:
generating a second of the one or more tables upon determining there are no additional trays;
performing a lookup of the second table to determine an action that is to be performed and select a tray corresponding to the action that is to be implemented; and
performing the action at the selected tray.

11. A printing system comprising:
a memory device to store one or more tray action tables; and
a print job manager to receive a print job included in a print job data stream, process the print job data stream to determine whether a tray has been specified, match job requirements specified in the print job data stream with content of the specified tray upon determining that a tray has been specified, perform a lookup of a first of the one or more tables to determine an action that is to be implemented at the specified tray based on a degree to which the content of the specified tray matches a print job requirement, wherein the degree to which the content of the specified tray matches the print job requirement is described by parameters, and wherein the action is included in one or more actions configured via a graphical user interface, and perform an action indicated in the one or more tables.

12. The printing system of claim 11 wherein the one or more tables comprise:
a second table that describes a tray selection and a course of action when a tray is not specified by a print job.

13. The printing system of claim 12 wherein the parameters include at least an orientation match and a duplex match.

14. The printing system of claim 11 wherein the print job manager determines whether the action is a change tray action and performs the action upon determining that the action is a not change tray action.

15. The printing system of claim 14 wherein the print job manager matches job requirements specified in the print job data stream with content of a first tray upon determining that the action is a change tray action and performs a lookup of the first table to determine an action that is to be implemented at the first tray.

16. The printing system of claim 15 wherein the print job manager determines whether there are additional trays, and for each additional tray matching job requirements specified in the print job data stream with content of the additional tray and performs a lookup of the first table to determine an action that is to be implemented at the additional tray.

17. The printing system of claim 16 wherein the print job manager generates the second table upon determining there are no additional trays, performs a lookup of the second table to determine an action that is to be performed and select a tray corresponding to the action that is to be implemented and performs the action at the selected tray.

18. The printing system of claim 12 wherein the print job manager matches job requirements specified in the print job data stream with content of a first tray upon determining that a tray has not been specified and performs a lookup of the first table to determine an action that is to be implemented at the first tray.

19. The printing system of claim 18 wherein the print job manager generates the second table, performs a lookup of the second table to determine an action that is to be performed and select a tray corresponding to the action that is to be implemented and performs the action at the selected tray.

* * * * *